United States Patent

Sare et al.

[11] Patent Number: 5,284,410
[45] Date of Patent: Feb. 8, 1994

[54] DEVICE FOR CARRYING LARGE SHEET MATERIAL

[76] Inventors: Ante Sare, 24-32 21st St. #5C, Astoria, N.Y. 11102; George Spector, 233 Broadway Rm 702, New York, N.Y. 10279

[21] Appl. No.: 949,981
[22] Filed: Sep. 24, 1992
[51] Int. Cl.⁵ .................................................. B60P 1/00
[52] U.S. Cl. ...................................... 414/11; 280/79.7; 280/47.131; 188/69
[58] Field of Search ............ 414/11; 280/79.7, 47.131; 188/69

[56] References Cited

U.S. PATENT DOCUMENTS

| | | | |
|---|---|---|---|
| 897,853 | 9/1908 | Vom Scheidt | 280/79.7 |
| 1,671,774 | 5/1928 | McIntosh | 188/69 |
| 1,735,541 | 11/1929 | Miller | 188/69 |
| 2,228,689 | 1/1941 | Collins | 280/47.131 |
| 2,769,664 | 11/1956 | Cornelius | 280/47.131 |
| 2,816,771 | 12/1957 | Hunt | 280/47.131 |
| 3,002,589 | 10/1961 | Cook | 188/69 |
| 3,580,601 | 5/1971 | Miles | 280/47.131 |
| 3,871,054 | 3/1975 | Schaefer | 414/11 |

Primary Examiner—Michael S. Huppert
Assistant Examiner—Gregory A. Morse

[57] ABSTRACT

A dolly for carrying sheet material is provided which consists of an elongated substantially U-shaped frame having a pair of spaced side walls projecting upwardly from a base, so as to receive part of one edge of the sheet material therein. A boss is integrally formed with the base of the frame and depends centrally therefrom. A shaft is mounted in the boss with its ends projecting on opposite sides of the boss. A pair of wheels are provided, with each journalled for rotation on each end of the shaft, so that a person can grip and push the sheet material to transport it along a flat surface.

2 Claims, 1 Drawing Sheet

DEVICE FOR CARRYING LARGE SHEET MATERIAL

BACKGROUND OF THE INVENTION

The instant invention relates generally to transporting devices and more specifically it relates to a dolly for carrying sheet material which provides a structure, so that the sheet material can be supported on its edge and transported by one person.

There are available various conventional transporting devices which do not provide the novel improvements of the invention herein disclosed.

SUMMARY OF THE INVENTION

A primary object of the present invention is to provide a dolly for carrying sheet material that will overcome the shortcomings of the prior art devices.

Another object is to provide a dolly for carrying sheet material on its edge, so that the sheet material can be transported by one person along a flat surface.

An additional object is to provide a dolly for carrying sheet material in which a mechanism thereon will maintain the dolly in a stationary position, so that the sheet material can be loaded and unloaded therefrom by the one person.

A further object is to provide a dolly for carrying sheet material that is simple and easy to use.

A still further object is to provide a dolly for carrying sheet material that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
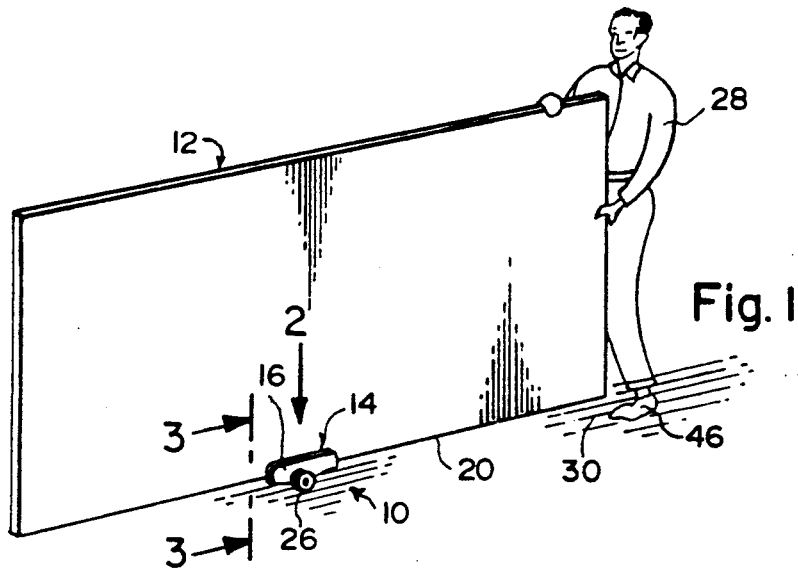
FIG. 1 is a perspective view of the instant invention supporting sheet material placed thereon.
Figure 2:
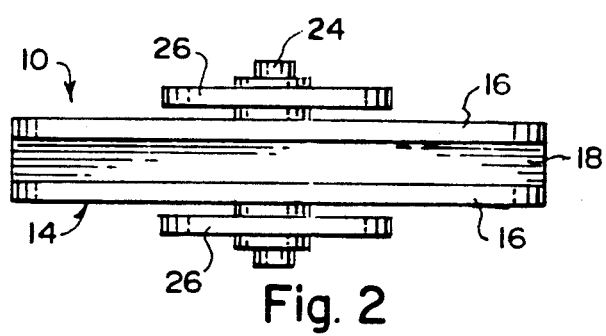
FIG. 2 is a top plan view taken in direction of arrow 2 in FIG. 1.
Figure 3:
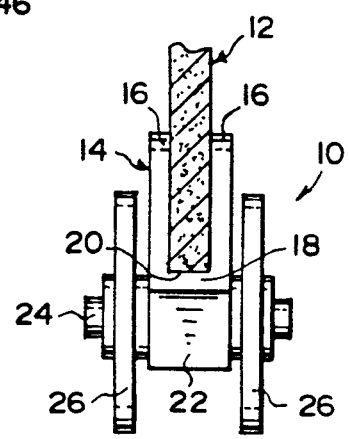
FIG. 3 is an end view taken along line 3—3 in FIG. 1.

Turning now descriptively to the drawings, in which similar reference characters denote similar elements throughout the several views, the Figures illustrate a dolly 10 for carrying sheet material 12, which consists of an elongated substantially U-shaped frame 14 having a pair of spaced side walls 16 projecting upwardly from a base 18, so as to receive part of one edge 20 of the sheet material 12 therein. A boss 22 is integrally formed with the base 18 of the frame and depends centrally therefrom. A shaft 24 is mounted in the boss 22 with its ends projecting on opposite sides of the boss 22. A pair of wheels 26 are provided, with each journalled for rotation on each end of the shaft 24, so that a person 28 can grip and push the sheet material 12 to transport it along a flat surface 30.

The frame 14 with the boss 22 is fabricated out of a durable strong material, so as to properly support the sheet material 12.

Figure 4:
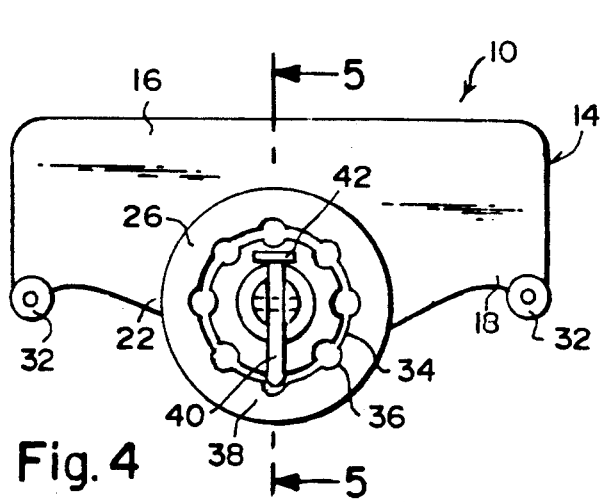
FIG. 4 is a side elevational view of a modification having end rollers for tipping and a step-on stop mechanism for one of the wheels to aid in loading and unloading the sheet material.

The dolly 10, as shown in FIG. 4, further contains a pair of rollers 32 arranged in depending relation at each end of the base 18 to allow the frame 14 to tip to the flat surface 30 on either side of the wheels 26, when the sheet material 12 is being transported along the flat surface 30.

Figure 5:
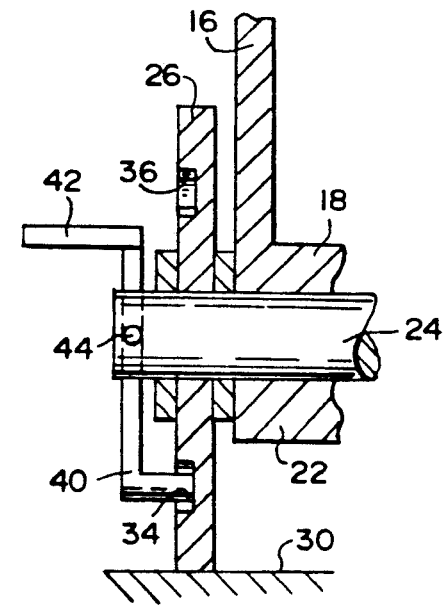
FIG. 5 is an enlarged cross sectional view taken along line 5—5 in FIG. 4, showing the step-on stop mechanism in greater detail.

As shown in FIGS. 4 and 5, a step-on stop mechanism 34 is also provided. One of the wheels 26 has an annular track 34 with a plurality of spaced apart position location areas 36 formed into an external side surface 38. A spring lever 40 having a step tread 42 is pivotally mounted on axle 44 on the end of the shaft 24, at the annular track 34. When a foot 46 of the person 28 presses down on the step tread 42, the spring lever 40 will contact one of the position location areas 36 in the annular track 34 to maintain the dolly 10 in a stationary position, for allowing the sheet material 12 to be loaded and unloaded therefrom by the person 28.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A dolly for carrying sheet material which comprises:
   a) an elongated substantially U-shaped frame having a pair of spaced side walls projecting upwardly from a base, so as to receive part of one edge of the sheet material therein;
   b) a boss integrally formed with said base of said frame and depending centrally therefrom;
   c) a shaft mounted in said boss with outer ends projecting outwardly on opposite sides of said boss;
   d) a pair of wheels, each journalled for rotation on each end of said shaft, so that a person can grip and push the sheet material to transport it along a flat surface in combination with a step- on stop mechanism wherein
   e) one of said wheels has an outer surface with an annular track having a plurality of spaced apart position location areas formed into said outer surface; and
   f) a lever having a step tread pivotally mounted about an axle affixed transversely to said shaft wherein said lever has means for engaging a selected one of said areas so that when a foot of the person presses down on said step tread, said lever means will pivot transversely towards said wheel outer surface to contact one of said areas in said annular track to retain said dolly in a stationary position for allowing the sheet material to be loaded and unloaded therefrom by the person.

2. A dolly as recited in claim 1, wherein said base has lower edges which slope upwardly toward ends which are spaced at right angles from said shaft axis, including pairs of rollers mounted at said ends, upwards of said wheels whereby said dolly may tip in opposite directions about said wheels to engage said rollers with the ground.

* * * * *